United States Patent
Liu

(10) Patent No.: US 10,963,558 B2
(45) Date of Patent: *Mar. 30, 2021

(54) MALWARE DETECTION METHOD AND MALWARE DETECTION APPARATUS

(71) Applicant: Huawei Technologies Co., Ltd., Shenzhen (CN)

(72) Inventor: Bu Liu, Wuhan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/723,469

(22) Filed: Dec. 20, 2019

(65) Prior Publication Data
US 2020/0159913 A1 May 21, 2020

Related U.S. Application Data

(63) Continuation of application No. 15/491,068, filed on Apr. 19, 2017, now Pat. No. 10,565,371, which is a (Continued)

(30) Foreign Application Priority Data

Nov. 20, 2014 (CN) .......................... 201410667648.4

(51) Int. Cl.
G06F 21/53 (2013.01)
G06F 21/56 (2013.01)

(52) U.S. Cl.
CPC .............. G06F 21/53 (2013.01); G06F 21/56 (2013.01); G06F 21/566 (2013.01); G06F 2221/034 (2013.01)

(58) Field of Classification Search
CPC ............. G06F 21/53; G06F 21/56–568; G06F 2221/034
See application file for complete search history.

(56) References Cited

U.S. PATENT DOCUMENTS 7,779,472 B1 8/2010 Lou
8,763,125 B1 * 6/2014 Feng ...................... G06F 21/56
726/24

(Continued)

FOREIGN PATENT DOCUMENTS

CN 1954297 A 4/2007
CN 101425016 A 5/2009
(Continued)

OTHER PUBLICATIONS

Machine Translation and Abstract of Japanese Publication No. JP2015130008, Jul. 16, 2015, 42 pages.
(Continued)

Primary Examiner — Thaddeus J Plecha
(74) Attorney, Agent, or Firm — Conley Rose, P.C.

(57) ABSTRACT

A malware detection method and a malware detection apparatus, where the method includes running to-be-detected software in a sandbox, and recording at least one operation, and in a process of recording the at least one operation, when it is detected that any interface that has a delay attribute in the sandbox is called, determining whether delay duration corresponding to a first delay length parameter of the called interface is greater than a preset duration. When the delay duration corresponding to the first delay length parameter is greater than the preset duration, delay duration of delay execution is reduced to enable the malicious behavior to be executed in the process of recording the at least one operation executed within the preset duration after the to-be-detected software starts to run.

20 Claims, 5 Drawing Sheets

Related U.S. Application Data continuation of application No. PCT/CN2015/077213, filed on Apr. 22, 2015.

(56) References Cited

U.S. PATENT DOCUMENTS

| | | | |
|---|---|---|---|
| 10,565,371 B2* | 2/2020 | Liu | G06F 21/53 |
| 10,817,606 B1* | 10/2020 | Vincent | G06F 21/566 |
| 2004/0236874 A1 | 11/2004 | Largman et al. | |
| 2005/0188272 A1 | 8/2005 | Bodorin et al. | |
| 2013/0007883 A1 | 1/2013 | Zaitsev | |
| 2013/0117848 A1 | 5/2013 | Golshan et al. | |
| 2013/0227690 A1 | 8/2013 | Kawaguchi et al. | |
| 2014/0380474 A1 | 12/2014 | Paithane et al. | |

FOREIGN PATENT DOCUMENTS

| | | |
|---|---|---|
| CN | 102930210 A | 2/2013 |
| CN | 103810427 A | 5/2014 |
| CN | 103927484 A | 7/2014 |
| JP | 2013171556 A | 9/2013 |
| JP | 2015130008 A | 7/2015 |
| WO | 2014147618 A1 | 9/2014 |
| WO | 2014209914 A1 | 12/2014 |
| WO | 2015042066 A1 | 3/2015 |

OTHER PUBLICATIONS

Kruegel, C., "Full System Emulation: Achieving Successful Automated Dynamic Analysis of Evasive Malware", Aug. 2014, 35 pages.

Foreign Communication From A Counterpart Application, European Application No. 15861269.7, Extended European Search Report dated Jun. 13, 2017, 8 pages.

Foreign Communication From A Counterpart Application, PCT Application No. PCT/CN2015/077213, English Translation of International Search Report dated Aug. 20, 2015, 3 pages.

Foreign Communication From A Counterpart Application, PCT Application No. PCT/CN2015/077213, English Translation of Written Opinion dated Aug. 20, 2015, 7 pages.

Foreign Communication From A Counterpart Application, Japanese Application No. 2017-514330, Japanese Office Action dated Oct. 10, 2017, 4 pages.

Foreign Communication From A Counterpart Application, Japanese Application No. 2017-514330, English Translation of Japanese Office Action dated Oct. 10, 2017, 5 pages.

Foreign Communication From A Counterpart Application, Chinese Application No. 201410667648.4, Chinese Office Action dated Feb. 26, 2018, 5 pages.

* cited by examiner

MALWARE DETECTION METHOD AND MALWARE DETECTION APPARATUS

CROSS-REFERENCE TO RELATED APPLICATIONS

This application is a continuation of U.S. patent application Ser. No. 15/491,068 filed on Apr. 19, 2017, which is a continuation of International Patent Application No. PCT/CN2015/077213 filed on Apr. 22, 2015, which claims priority to Chinese Patent Application No. 201410667648.4 filed on Nov. 20, 2014. All of the aforementioned patent applications are hereby incorporated by reference in their entireties.

TECHNICAL FIELD

The present disclosure relates to the field of computer technologies, and in particular, to a malware detection method and a malware detection apparatus.

BACKGROUND

Computer software refers to a set of a series of computer data and instructions that are organized in a specific sequence. Malware appears shortly after emergence of the computer software. A development purpose of legitimate software is to enhance and extend an operation capability of a computer. However, a development purpose of malware is to steal and destroy computer data. A conventional malware detection method is implemented based on feature code comparison. However, malware usually evades the feature code comparison by means of morphing, packing, and the like. The morphing refers to adding a large quantity of obfuscated code to program code of software to invalidate an original feature code. The packing refers to encrypting and packing program code of software to invalidate an original feature code.

To avoid the foregoing defect, a method for detecting malware using a sandbox technology is proposed. A sandbox is a software isolation and running mechanism, and a purpose of the sandbox is to limit permission of untrusted software. The sandbox technology is frequently used to execute untested or untrusted software. To avoid a case in which the untrusted software may destroy running of other software, the sandbox technology provides virtualized disk, memory, and network resources for the untrusted software in order to protect an original status of an operating system. In a specific implementation process of the sandbox technology, all files and registry entries that are created, modified, and deleted by the untrusted software when the untrusted software is running in a sandbox are virtualized and redirected to a virtual operating system. Therefore, all operations of the untrusted software are virtual, and a real file system and a real registry are not modified, which can ensure that malware carrying a virus cannot modify a key part of an operating system and cannot destroy the operating system.

A specific operating principle of detecting malware using the sandbox technology is to simulate a completely normal environment for untrusted software to run, and record all operations performed by the untrusted software when the untrusted software runs. The operations are matched with a malicious behavior database. If a matching malicious behavior is identified, it can be considered that the untrusted software is malware. Because the method can directly enable the malware to run in the sandbox, the malware can be prevented from evading detection by means of morphing, packing, and the like, which may improve accuracy of malware detection. Compared with the conventional detection method, a detection capability of the method for detecting malware using a sandbox is greatly improved. In addition, because the method for detecting malware using a sandbox uses a universal malicious behavior database as a matching manner, a problem that a base quantity of malicious samples of the same type is extremely large may be avoided.

However, in practical application, monitoring for an extremely long time is unpractical due to a limitation of a hardware resource and a software specification. The sandbox can generally monitor only behaviors performed within several minutes after the untrusted software starts to run. Due to this limitation, the malware adds a delay operation before an outbreak of a malicious behavior. For example, a long-time sleep statement is added. The statement may delay some operations in a software running process for tens of minutes or even several hours in order to evade detection. Therefore, a defect of relatively low accuracy exists in a current malware detection method.

SUMMARY

Embodiments of the present disclosure provide a malware detection method and a malware detection apparatus to resolve a defect of relatively low accuracy existing in other approaches.

Specific technical solutions provided in the embodiments of the present disclosure are as follows.

According to a first aspect, a malware detection method is provided, including running to-be-detected software in a sandbox, and recording at least one operation executed within preset duration after the to-be-detected software starts to run, in a process of recording the at least one operation, detecting whether at least one interface that has a delay attribute in the sandbox is called, when it is detected that any one of the interface is called, determining whether delay duration corresponding to a first delay length parameter of the called interface is greater than the preset duration, adjusting the first delay length parameter of the called interface to a second delay length parameter if the delay duration corresponding to the first delay length parameter is greater than the preset duration, where delay duration corresponding to the second delay length parameter is less than the preset duration, and comparing the at least one recorded operation with an operation of a malicious behavior, and determining, based on a comparison result that an operation that matches the operation of the malicious behavior exists in the at least one recorded operation, that the to-be-detected software is malware.

With reference to the first aspect, in a first possible implementation manner, adjusting the first delay length parameter of the called interface to a second delay length parameter includes adjusting the first delay length parameter of the called interface to a product of the first delay length parameter and a preset adjustment parameter, where the adjustment parameter is greater than 0 and less than 1.

With reference to the first possible implementation manner of the first aspect, in a second possible implementation manner, the preset adjustment parameter includes a first adjustment parameter and a second adjustment parameter, and the first adjustment parameter is greater than the second adjustment parameter, and adjusting the first delay length parameter of the called interface to a second delay length parameter includes obtaining usage of a central processing unit of a device on which the sandbox is located, comparing the obtained usage with a preset usage threshold, and adjusting the first delay length parameter of the called interface to a product of the first delay length parameter and the first adjustment parameter based on a comparison result that the usage is greater than or equal to the preset usage threshold, or adjusting the first delay length parameter of the called interface to a product of the first delay length parameter and the second adjustment parameter based on a comparison result that the usage is less than the preset usage threshold.

With reference to the first aspect, in a third possible implementation manner, adjusting the first delay length parameter of the called interface to a second delay length parameter includes obtaining usage of a central processing unit of a device on which the sandbox is located, comparing the obtained usage with a preset usage threshold, and adjusting the first delay length parameter of the called interface to the second delay length parameter based on a comparison result that the usage is greater than or equal to the preset usage threshold, or adjusting the first delay length parameter of the called interface to a third delay length parameter based on a comparison result that the usage is less than the preset usage threshold, where delay duration corresponding to the third delay length parameter is less than the delay duration corresponding to the second delay length parameter.

With reference to any one of the first aspect, or the first to the third possible implementation manners of the first aspect, in a fourth possible implementation manner, the method further includes comparing the at least one recorded operation with the operation of the malicious behavior at a predetermined moment before the preset duration ends, sending a software end-of-running message to the sandbox based on a comparison result that no operation that matches the operation of the malicious behavior exists in the at least one recorded operation, recording at least one operation executed by the to-be-detected software in a time period from the predetermined moment to a moment at which the preset duration ends, and comparing the operation of the malicious behavior with the at least one recorded operation executed by the to-be-detected software in the time period from the predetermined moment to the moment at which the preset duration ends, and determining, based on a comparison result that an operation that matches the operation of the malicious behavior exists in the at least one recorded operation executed by the to-be-detected software in the time period from the predetermined moment to the moment at which the preset duration ends, that the to-be-detected software is malware.

With reference to any one of the first aspect, or the first to the fourth possible implementation manners of the first aspect, in a fifth possible implementation manner, the interface includes one or a combination of an interface for delaying one process, an interface for delaying multiple processes, an interface for delaying a timer, or an interface for obtaining a system time.

According to a second aspect, a malware detection apparatus is provided, including a running unit configured to run to-be-detected software in a sandbox, a recording unit configured to record at least one operation executed within preset duration after the to-be-detected software starts to run, a detection unit configured to detect, in a process of recording the at least one operation, whether at least one interface that has a delay attribute in the sandbox is called, a determining unit configured to, when it is detected that any one of the interface is called, determine whether delay duration corresponding to a first delay length parameter of the called interface is greater than the preset duration, an adjustment unit configured to adjust the first delay length parameter of the called interface to a second delay length parameter if the delay duration corresponding to the first delay length parameter is greater than the preset duration, where delay duration corresponding to the second delay length parameter is less than the preset duration, and a comparison unit configured to compare the at least one recorded operation with an operation of a malicious behavior, and determine, based on a comparison result that an operation that matches the operation of the malicious behavior exists in the at least one recorded operation, that the to-be-detected software is malware.

With reference to the second aspect, in a first possible implementation manner, the adjustment unit is configured to adjust the first delay length parameter of the called interface to a product of the first delay length parameter and a preset adjustment parameter, where the adjustment parameter is greater than 0 and less than 1.

With reference to the first possible implementation manner of the second aspect, in a second possible implementation manner, the preset adjustment parameter includes a first adjustment parameter and a second adjustment parameter, and the first adjustment parameter is greater than the second adjustment parameter, and the adjustment unit is configured to obtain usage of a central processing unit of a device on which the sandbox is located, compare the obtained usage with a preset usage threshold, and adjust the first delay length parameter of the called interface to a product of the first delay length parameter and the first adjustment parameter based on a comparison result that the usage is greater than or equal to the preset usage threshold, or adjust the first delay length parameter of the called interface to a product of the first delay length parameter and the second adjustment parameter based on a comparison result that the usage is less than the preset usage threshold.

With reference to the second aspect, in a third possible implementation manner, the adjustment unit is configured to obtain usage of a central processing unit of a device on which the sandbox is located, compare the obtained usage with a preset usage threshold, and adjust the first delay length parameter of the called interface to the second delay length parameter based on a comparison result that the usage is greater than or equal to the preset usage threshold, or adjust the first delay length parameter of the called interface to a third delay length parameter based on a comparison result that the usage is less than the preset usage threshold, where delay duration corresponding to the third delay length parameter is less than the delay duration corresponding to the second delay length parameter.

With reference to any one of the second aspect, or the first to the third possible implementation manners of the second aspect, in a fourth possible implementation manner, the comparison unit is further configured to compare the at least one recorded operation with the operation of the malicious behavior at a predetermined moment before the preset duration ends, the apparatus further includes a sending unit configured to send a software end-of-running message to the sandbox based on a comparison result that no operation that matches the operation of the malicious behavior exists in the at least one recorded operation, the recording unit is further configured to record at least one operation executed by the to-be-detected software in a time period from the predetermined moment to a moment at which the preset duration ends, and the comparison unit is further configured to compare the operation of the malicious behavior with the at least one recorded operation executed by the to-be-detected software in the time period from the predetermined moment to the moment at which the preset duration ends, and determine, based on a comparison result that an operation that matches the operation of the malicious behavior exists in the at least one recorded operation executed by the to-be-detected software in the time period from the predetermined moment to the moment at which the preset duration ends, that the to-be-detected software is malware.

With reference to any one of the second aspect, or the first to the fourth possible implementation manners of the second aspect, in a fifth possible implementation manner, the interface detected by the detection unit includes one or a combination of an interface for delaying one process, an interface for delaying multiple processes, an interface for delaying a timer, or an interface for obtaining a system time.

In the other approaches, evading detection by delaying a malicious operation results in relatively low detection accuracy. In the embodiments of the present disclosure, to-be-detected software runs in a sandbox, and at least one operation executed within preset duration after the to-be-detected software starts to run is recorded. In a process of recording the at least one operation, whether at least one interface that has a delay attribute in the sandbox is called is detected. When it is detected that any one of the interface is called, whether delay duration corresponding to a first delay length parameter of the called interface is greater than preset duration is determined. If the delay duration corresponding to the first delay length parameter is greater than the preset duration, the first delay length parameter of the called interface is adjusted to a second delay length parameter, where delay duration corresponding to the second delay length parameter is less than the preset duration. The at least one recorded operation is compared with an operation of a malicious behavior. It is determined, based on a comparison result that an operation that matches the operation of the malicious behavior exists in the at least one recorded operation, that the to-be-detected software is malware. In the solution, in the process of recording the at least one operation, when it is detected that any one of the interface that has a delay attribute in the sandbox is called, and it is determined that the delay duration corresponding to the first delay length parameter is greater than the preset duration, it is considered that execution of the malicious behavior is to be delayed. In this case, delay duration of delay execution is reduced to enable the malicious behavior to be executed in the process of recording the at least one operation executed within the preset duration after the to-be-detected software starts to run, and accordingly the malicious behavior may be exposed in advance, which can implement effective monitoring, and therefore can improve accuracy of malware detection.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

In addition, the terms "system" and "network" may be used interchangeably in this specification. The term "and/or" in this specification describes only an association relationship between associated objects and represents that three relationships may exist. For example, A and/or B may represent the following three cases, only A exists, both A and B exist, and only B exists. In addition, the character "/" in this specification generally indicates an "or" relationship between the associated objects.

In the following, implementation manners of the present disclosure are described in detail with reference to the accompanying drawings. It should be understood that the embodiments described herein are merely used to illustrate and explain the present disclosure, but are not intended to limit the present disclosure. In addition, the embodiments of the present application and features in the embodiments may be mutually combined in a case in which they do not conflict with each other.

In the following, the implementation manners of the present disclosure are described in detail with reference to the accompanying drawings.

Figure 1A:
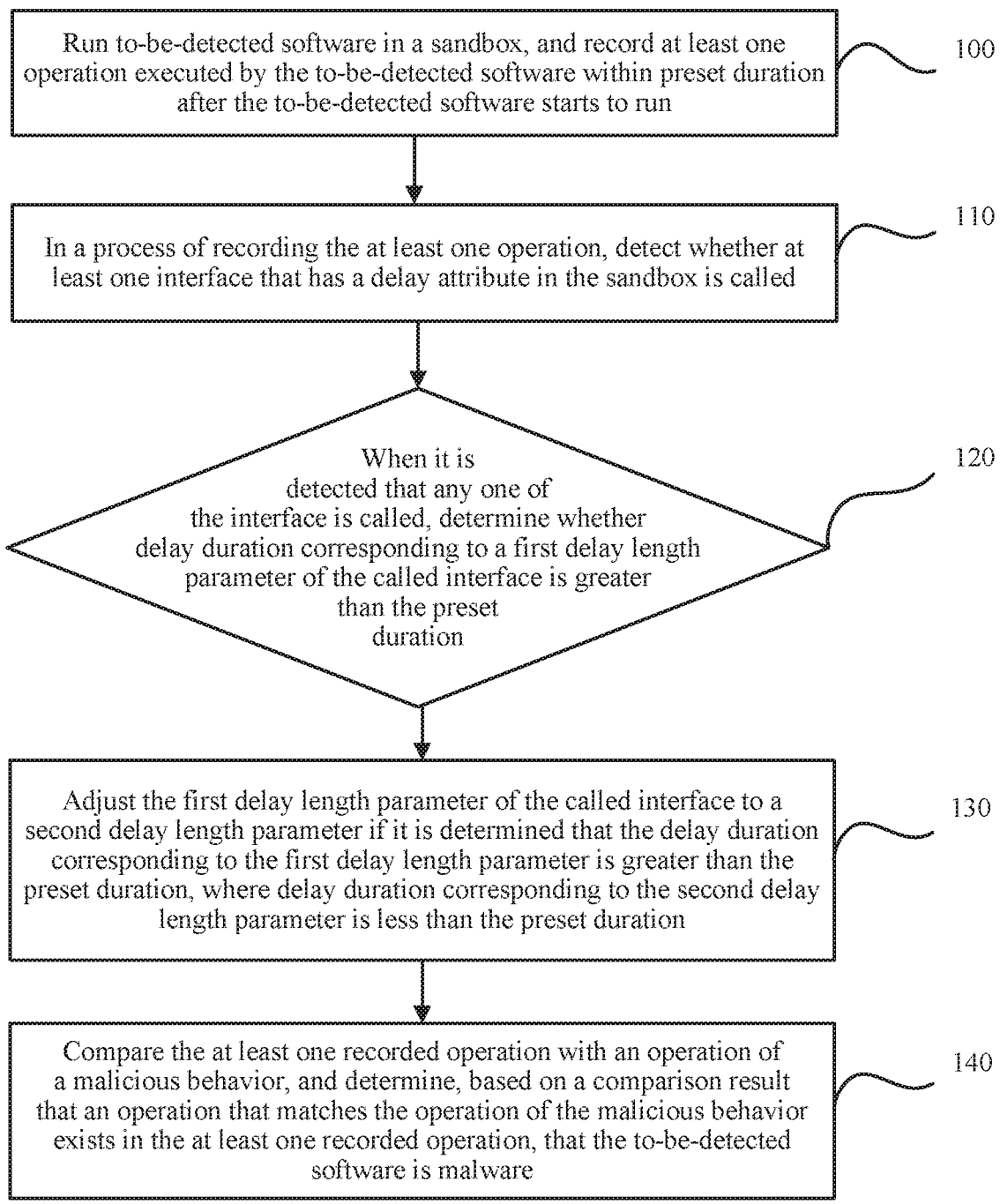
FIG. 1A is a flowchart of a malware detection method according to an embodiment of the present disclosure.

As shown in FIG. 1A, in this embodiment of the present disclosure, a schematic flowchart of a malware detection method is provided.

Step 100: Run to-be-detected software in a sandbox, and record at least one operation executed within preset duration after the to-be-detected software starts to run.

Step 110: In a process of recording the at least one operation, detect whether at least one interface that has a delay attribute in the sandbox is called.

Step 120: When it is detected that any one of the interface is called, determine whether delay duration corresponding to a first delay length parameter of the called interface is greater than the preset duration.

Step 130: Adjust the first delay length parameter of the called interface to a second delay length parameter if the delay duration corresponding to the first delay length parameter is greater than the preset duration, where delay duration corresponding to the second delay length parameter is less than the preset duration.

Step 140: Compare the at least one recorded operation with an operation of a malicious behavior, and determine, based on a comparison result that an operation that matches the operation of the malicious behavior exists in the at least one recorded operation, that the to-be-detected software is malware.

The interface described in this embodiment of the present disclosure is a programmable interface that is provided by an operating system for a third-party application software developer except an operating system provider and a user. Application software may implement, by calling the interface, a specific function provided by the interface. The interface is different from a physical interface described in practical application, for example, different from an Ethernet interface.

That the interface has a delay attribute means that when application software calls the interface, execution of some operations executed by the application software is to be delayed. A specific time length for which the execution needs to be delayed may be determined according to delay duration corresponding to a delay length parameter of the interface.

In practice, an interface that has a delay attribute may be in one of the following forms, for example:

Kernel32.dll:Sleep—An interface function for delaying a current thread for a specified time;

Kernel32.dll:SleepEx—An interface function for delaying a current thread for a specified time;

Kernel32.dll:WaitForSingleObject—An interface function for delaying a current thread until an event occurs;

Kernel32.dll:WaitForMultipleObject—An interface function for delaying a current thread until one of multiple events occurs;

User32.dll:SetTimer—An interface function for delaying a timer; and

Winmn.dll:timeSetEvent—An interface function for delaying a timer.

In this embodiment of the present disclosure, if any one of interfaces that have a delay attribute (for example, the foregoing interfaces) is called, execution of some operations of the application software is to be delayed. Duration for which the execution is delayed is the delay duration corresponding to the first delay length parameter of the called interface that has a delay attribute, and a start time point at which the execution is delayed is a time point at which the to-be-detected software starts to run.

In this embodiment of the present disclosure, there is also a type of interface for obtaining a time. A relationship exists between the type of interface and the foregoing interface that has a delay attribute. The interface for obtaining a time may be in one of the following forms:

Kernel32.dll:GetTickCount—An interface function for obtaining a time (in milliseconds);

Kernel32.dll:GetLocalTime—An interface function for obtaining a local date and time of a current system;

Kernel32.dll:GetSystemTime—An interface function for obtaining a UTC time of a system;

Kernel32.dll:GetSystemTimes—An interface function for obtaining multiple types of related time information of a system;

Kernel32.dll:QueryPerformanceCounter—An interface function for obtaining a time of a high-precision timer;

User32.dll:GetMessageTime—An interface function for obtaining a time of a message; and Winmn.dll:timeGetTime—An interface function for obtaining a time (in milliseconds)

The foregoing listed interfaces that have a delay attribute are some functions provided in advance in a WINDOWS operating system. These interfaces are related to the operating system to a great extent, that is, a LINUX system or another operating system may also provide another interface that has a delay attribute. Although these application programming interface (APIs) differ from each other in a name, a parameter format, and the like, they generally implement similar functions. Because there are many types of operating systems, and different versions of an operating system also differ from each other, it is hard to list all interfaces that have a delay attribute herein, and only some common interfaces in the WINDOWS operating system that have a delay attribute are used as examples for description.

If the malware performs a delay by calling these interfaces that have a delay attribute, when a time point determined according to the first delay length parameter of the interface ends, the malware starts to execute a malicious behavior.

In this embodiment of the present disclosure, the first delay length parameter of the called interface may be adjusted to the second delay length parameter in multiple manners. For example, the following manner may be used: adjusting the first delay length parameter of the called interface to a product of the first delay length parameter and a preset adjustment parameter, where the adjustment parameter is greater than 0 and less than or equal to 1.

For example, for the interface that has a delay attribute, the first delay length parameter is changed according to a multiplying power of $g\_uiRate$. If the first delay length parameter is 100, the first delay length parameter is changed to $100 \times g\_uiRate$. Optionally, if an operating system time needs to be matched with a time obtained by means of delaying using the interface that has a delay attribute in order to prevent the malware from identifying a change of the first delay length parameter of the interface that has a delay attribute, an operating system time obtained by the malware may be synchronously changed using the foregoing described interface for obtaining a time. If a current operating system time is 100, when the malware calls an interface for obtaining a time, a calling result needs to be changed to $100/g\_uiRate$ using a returned value of the type of interface.

In practical application, a manner in which malware evades detection by delaying an outbreak of a malicious behavior generally needs to be implemented by calling an interface that has a delay attribute. According to the foregoing embodiments, even though the malware calls the interface that has a delay attribute, a malicious behavior is still exposed within preset duration because a first delay length parameter of the interface is adjusted to a second delay length parameter and delay duration corresponding to the second delay length parameter is less than the preset duration, which improves detection accuracy.

In this embodiment of the present disclosure, optionally, the preset adjustment parameter includes a first adjustment parameter and a second adjustment parameter, and the first adjustment parameter is greater than the second adjustment parameter.

Further, to prevent another process in a device on which the sandbox is located from being affected by malware detection, when the first delay length parameter of the called interface is adjusted to the second delay length parameter, the following operations may be performed: obtaining usage of a central processing unit of the device on which the sandbox is located, comparing the obtained usage with a preset usage threshold, and adjusting the first delay length parameter of the called interface to a product of the first delay length parameter and the first adjustment parameter based on a comparison result that the usage is greater than or equal to the preset usage threshold, that is, the second delay length parameter is the product of the first delay length parameter and the first adjustment parameter, or adjusting the first delay length parameter of the called interface to a product of the first delay length parameter and the second adjustment parameter based on a comparison result that the usage is less than the preset usage threshold, that is, the second delay length parameter is the product of the first delay length parameter and the second adjustment parameter.

The first adjustment parameter is greater than the second adjustment parameter.

In this embodiment of the present disclosure, when the first delay length parameter of the called interface is adjusted to the second delay length parameter, the following manners may be further used: obtaining usage of a central processing unit of a device on which the sandbox is located, comparing the obtained usage with a preset usage threshold, and adjusting the first delay length parameter of the called interface to the second delay length parameter based on a comparison result that the usage is greater than or equal to the preset usage threshold, or adjusting the first delay length parameter of the called interface to a third delay length parameter based on a comparison result that the usage is less than the preset usage threshold, where delay duration corresponding to the third delay length parameter is less than the delay duration corresponding to the second delay length parameter.

In this embodiment of the present disclosure, in the foregoing process, when the usage of the central processing unit of the device on which the sandbox is located is being obtained, an Nt Query System Information interface may be used to obtain the usage of the central processing unit. Certainly, other methods may also be used, which are not described in detail one by one herein.

In the foregoing process, when the usage is greater than or equal to the preset usage threshold, it is determined that a system is busy. In this case, delay duration corresponding to an adjusted delay length parameter is extended to reduce impact of the running sandbox on the usage of the central processing unit. When the usage is less than the preset usage threshold, it is determined that a system is not busy. In this case, delay duration corresponding to an adjusted delay length parameter is shorten to accelerate exposure of a behavior of the to-be-detected software in order to increase the usage of the central processing unit when the sandbox is running.

In practical application, some malicious behaviors are executed after a delay of specified duration. In this case, whether the to-be-detected software is malware may be detected by adjusting the first delay length parameter of the interface that has a delay attribute. However, some malicious behaviors are executed when running of malware ends and the interface that has a delay attribute does not need to be called. Therefore, in this embodiment of the present disclosure, the following operations may be further included, at a predetermined moment before the preset duration ends, comparing at least one recorded operation that is recorded before the predetermined moment with the operation of the malicious behavior, sending a software end-of-running message to the sandbox based on a comparison result that no operation that matches the operation of the malicious behavior exists in the at least one recorded operation that is recorded before the predetermined moment, recording at least one operation executed by the to-be-detected software in a time period from the predetermined moment to a moment at which the preset duration ends, and comparing the operation of the malicious behavior with the at least one recorded operation executed by the to-be-detected software in the time period from the predetermined moment to the moment at which the preset duration ends, and determining, based on a comparison result that an operation that matches the operation of the malicious behavior exists in the at least one recorded operation executed by the to-be-detected software in the time period from the predetermined moment to the moment at which the preset duration ends, that the to-be-detected software is malware.

For example, the preset duration is 5 minutes. However, when the to-be-detected software has run for 4 minutes and 50 seconds in the sandbox, and no operation that matches the operation of the malicious behavior exists in at least one recorded operation, the software end-of-running message is sent to the sandbox. Then at least one operation executed by the to-be-detected software in a time period from 4 minutes and 50 seconds to a moment at which 5 minutes end is recorded. The at least one operation executed by the to-be-detected software in the time period from 4 minutes and 50 seconds to the moment at which 5 minutes end is compared with the operation of the malicious behavior. If an operation that matches the operation of the malicious behavior exists in the at least one operation executed by the to-be-detected software in the time period from 4 minutes and 50 seconds to the moment at which 5 minutes end, it is determined that the to-be-detected software is malware. In this way, a purpose of forcing a malicious sample to expose a malicious behavior can be achieved.

In this embodiment of the present disclosure, the interface is one or a combination of an interface for delaying one process, an interface for delaying multiple processes, an interface for delaying a timer, or an interface for obtaining a system time.

In this embodiment of the present disclosure, that an operation that matches an operation of a malicious behavior exists in the at least one recorded operation means that a behavior sequence (for example, an API calling sequence) corresponding to an operation in the at least one recorded operation is completely the same as a behavior sequence (for example, an API calling sequence) corresponding to the operation of the malicious behavior, or means that a behavior sequence corresponding to an operation in the at least one recorded operation is partially the same as a behavior sequence corresponding to the operation of the malicious behavior.

Figure 1B:
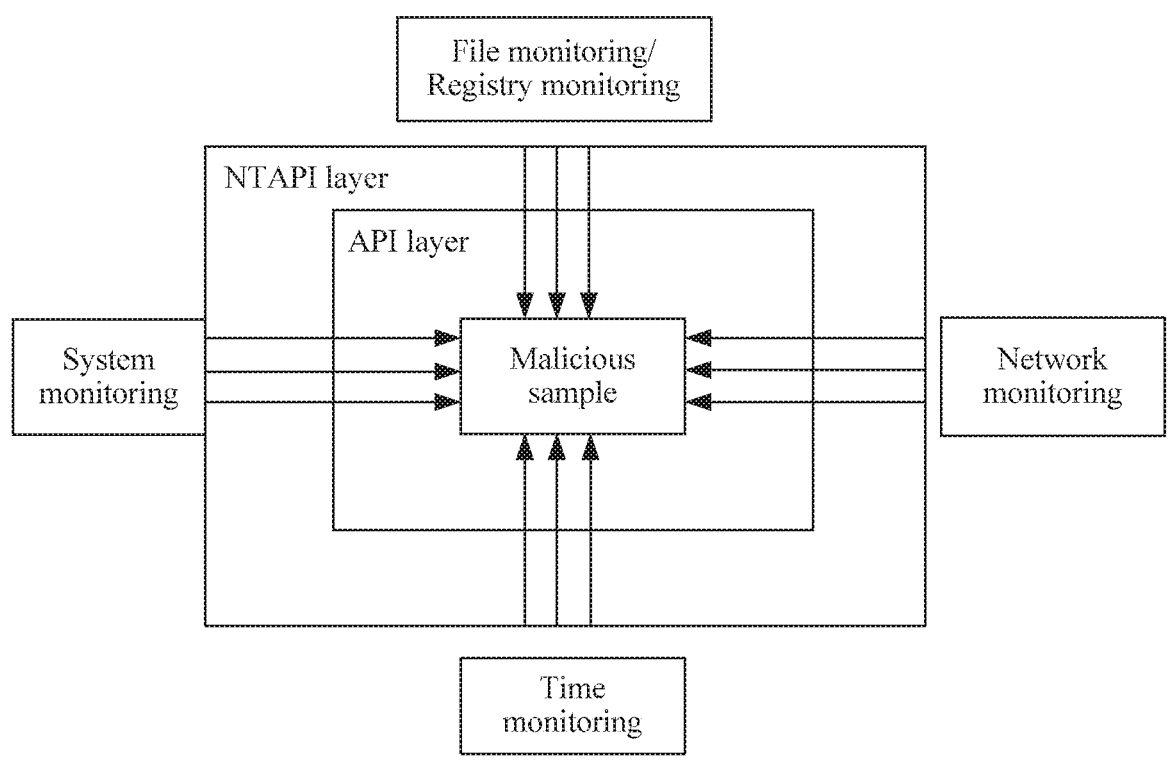
FIG. 1B is a schematic diagram of malware detection according to an embodiment of the present disclosure.

In this embodiment of the present disclosure, the interface that has a delay attribute may be located at an API layer, or may be located at a Native API (NTAPI) layer. If the interface is located at the API layer, a driver layer may be used or a driver layer may not be used to adjust the first delay length parameter of the interface. If the interface is located at the NTAPI layer, a driver layer needs to be used to adjust the first delay length parameter of the interface. The operation executed within the preset duration after the to-be-detected software starts to run may be a network operation, which in this case, may be implemented by means of network monitoring, may be a file operation, which in this case, may be implemented by means of file monitoring, or may be a registry operation, which in this case, may be implemented by means of registry monitoring. Some operations cannot be implemented by means of the foregoing monitoring, and therefore may be implemented by means of system monitoring, as shown in FIG. 1B.

Figure 2A:
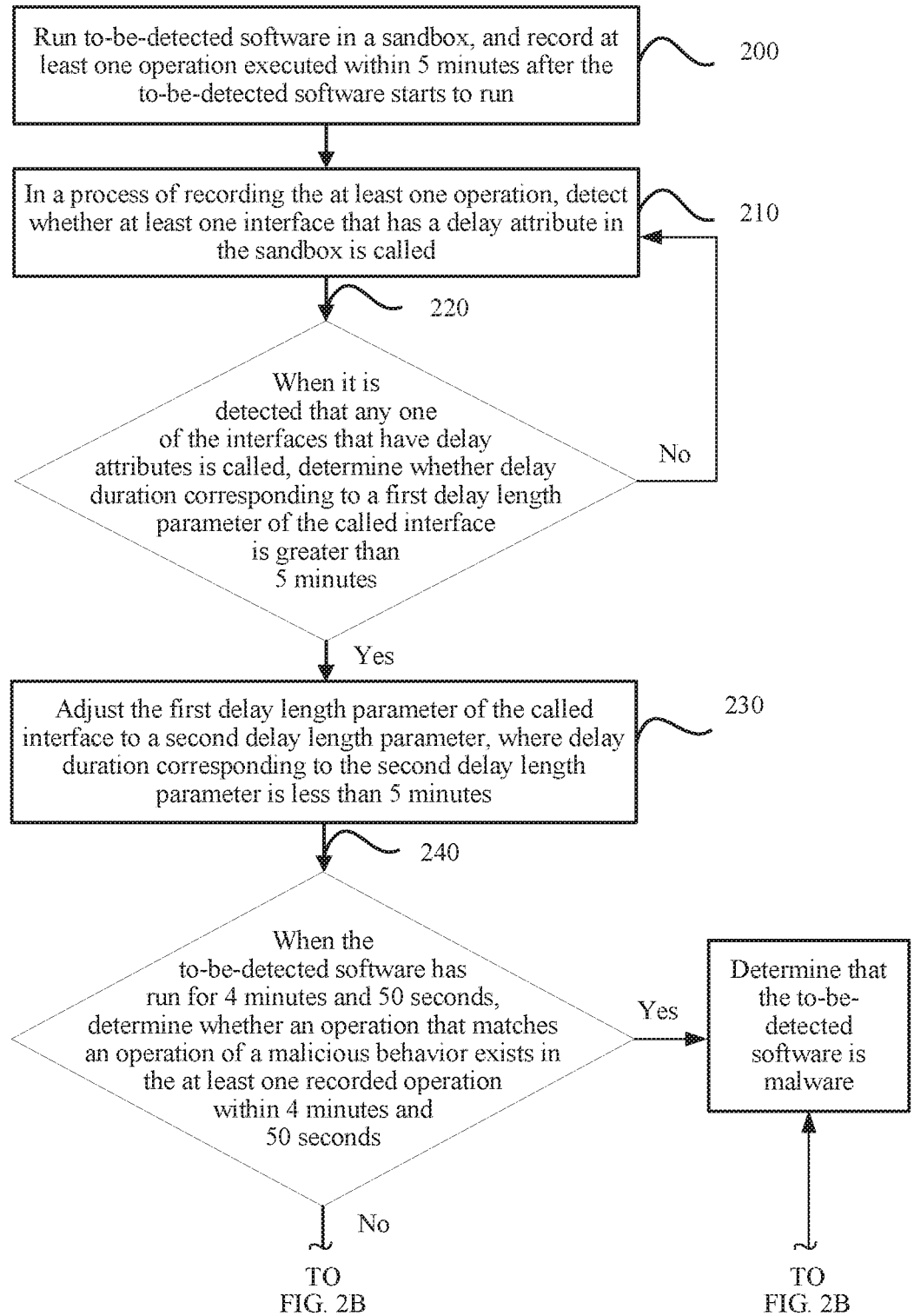
FIG. 2A and FIG. 2B are flowcharts of a specific malware detection embodiment of the present disclosure.
Figure 2B:
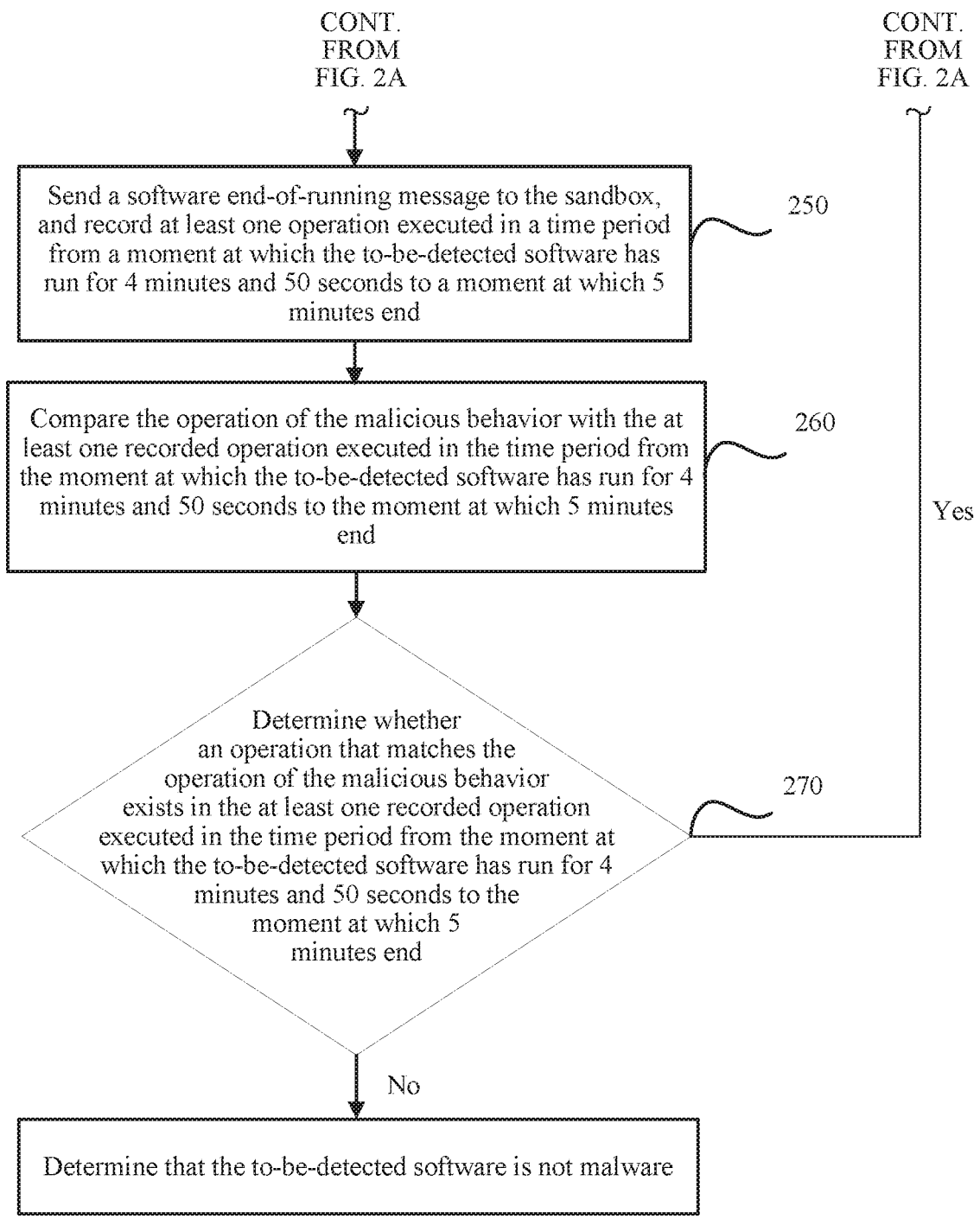

To better understand this embodiment of the present disclosure, the following provides a specific application scenario and describes a process of malware detection in further details, as shown in FIG. 2A and FIG. 2B.

Step 200: Run to-be-detected software in a sandbox, and record at least one operation executed within 5 minutes after the to-be-detected software starts to run.

Step 210: In a process of recording the at least one operation, detect whether at least one interface that has a delay attribute in the sandbox is called.

Step 220: When it is detected that any one of the interface that has a delay attribute is called, determine whether delay duration corresponding to a first delay length parameter of the called interface is greater than 5 minutes, if the delay duration corresponding to the first delay length parameter of the called interface is greater than 5 minutes, perform step 230, or if the delay duration corresponding to the first delay length parameter of the called interface is not greater than 5 minutes, go back to step 210.

Step 230: Adjust the first delay length parameter of the called interface to a second delay length parameter, where delay duration corresponding to the second delay length parameter is less than 5 minutes.

Step 240: When the to-be-detected software has run for 4 minutes and 50 seconds, determine whether an operation that matches an operation of a malicious behavior exists in the at least one recorded operation within 4 minutes and 50 seconds, if an operation that matches the operation of the malicious behavior exists in the at least one recorded operation within 4 minutes and 50 seconds, determine that the to-be-detected software is malware, or if no operation that matches the operation of the malicious behavior exists in the at least one recorded operation within 4 minutes and 50 seconds, perform step 250.

Step 250: Send a software end-of-running message to the sandbox, and record at least one operation executed in a time period from a moment at which the to-be-detected software has run for 4 minutes and 50 seconds to a moment at which 5 minutes end.

Step 260: Compare the operation of the malicious behavior with the at least one recorded operation executed in the time period from the moment at which the to-be-detected software has run for 4 minutes and 50 seconds to the moment at which 5 minutes end.

Step 270: Determine whether an operation that matches the operation of the malicious behavior exists in the at least one recorded operation executed in the time period from the moment at which the to-be-detected software has run for 4 minutes and 50 seconds to the moment at which 5 minutes end, if an operation that matches the operation of the malicious behavior exists in the at least one recorded operation executed in the time period from the moment at which the to-be-detected software has run for 4 minutes and 50 seconds to the moment at which 5 minutes end, determine that the to-be-detected software is malware, or if no operation that matches the operation of the malicious behavior exists in the at least one recorded operation executed in the time period from the moment at which the to-be-detected software has run for 4 minutes and 50 seconds to the moment at which 5 minutes end, determine that the to-be-detected software is not malware.

In conclusion, in this embodiment of the present disclosure, to-be-detected software runs in a sandbox, and at least one operation executed within preset duration after the to-be-detected software starts to run is recorded. In a process of recording the at least one operation, whether at least one interface that has a delay attribute in the sandbox is called is detected. When it is detected that any one of the interface is called, whether delay duration corresponding to a first delay length parameter of the called interface is greater than the preset duration is determined. If the delay duration corresponding to the first delay length parameter is greater than the preset duration, the first delay length parameter of the called interface is adjusted to a second delay length parameter, where delay duration corresponding to the second delay length parameter is less than the preset duration. The at least one recorded operation is compared with an operation of a malicious behavior. It is determined, based on a comparison result that an operation that matches the operation of the malicious behavior exists in the at least one recorded operation, that the to-be-detected software is malware. In the solution, in the process of recording the at least one operation, when it is detected that any one of the interface that has a delay attribute in the sandbox is called, and it is determined that the delay duration corresponding to the first delay length parameter is greater than the preset duration, it is considered that execution of the malicious behavior is to be delayed. In this case, delay duration of delay execution is reduced to enable the malicious behavior to be executed in the process of recording the at least one operation executed within the preset duration after the to-be-detected software starts to run, and accordingly, the malicious behavior may be exposed in advance, which can implement effective monitoring, and therefore can improve accuracy of malware detection.

Figure 3:
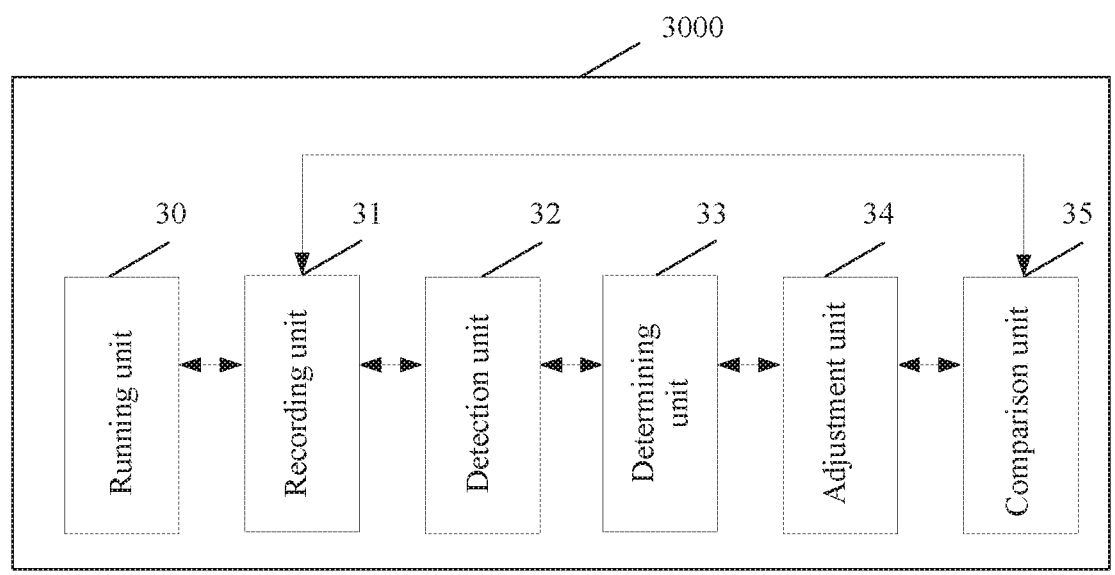
FIG. 3 is a first schematic structural diagram of a malware detection apparatus according to an embodiment of the present disclosure.

Based on the foregoing technical solutions of the corresponding methods, as shown in FIG. 3, an embodiment of the present disclosure provides a malware detection apparatus 3000. The malware detection apparatus 3000 includes a running unit 30, a recording unit 31, a detection unit 32, a determining unit 33, an adjustment unit 34, and a comparison unit 35.

The running unit 30 is configured to run to-be-detected software in a sandbox.

The recording unit 31 is configured to record at least one operation executed within preset duration after the to-be-detected software starts to run.

The detection unit 32 is configured to detect, in a process of recording the at least one operation, whether at least one interface that has a delay attribute in the sandbox is called.

The determining unit 33 is configured to, when it is detected that any one of the interface is called, determine whether delay duration corresponding to a first delay length parameter of the called interface is greater than the preset duration.

The adjustment unit 34 is configured to adjust the first delay length parameter of the called interface to a second delay length parameter if the delay duration corresponding to the first delay length parameter is greater than the preset duration, where delay duration corresponding to the second delay length parameter is less than the preset duration.

The comparison unit 35 is configured to compare the at least one recorded operation with an operation of a malicious behavior, and determine, based on a comparison result that an operation that matches the operation of the malicious behavior exists in the at least one recorded operation, that the to-be-detected software is malware.

In this embodiment of the present disclosure, optionally, the adjustment unit 34 is configured to adjust the first delay length parameter of the called interface to a product of the first delay length parameter and a preset adjustment parameter, where the adjustment parameter is greater than 0 and less than 1.

In this embodiment of the present disclosure, optionally, the preset adjustment parameter includes a first adjustment parameter and a second adjustment parameter, and the first adjustment parameter is greater than the second adjustment parameter.

The adjustment unit 34 is configured to obtain usage of a central processing unit of a device on which the sandbox is located, compare the obtained usage with a preset usage threshold, and adjust the first delay length parameter of the called interface to a product of the first delay length parameter and the first adjustment parameter based on a comparison result that the usage is greater than or equal to the preset usage threshold, or adjust the first delay length parameter of the called interface to a product of the first delay length parameter and the second adjustment parameter based on a comparison result that the usage is less than the preset usage threshold.

In this embodiment of the present disclosure, optionally, the adjustment unit 34 is configured to obtain usage of a central processing unit of a device on which the sandbox is located, compare the obtained usage with a preset usage threshold, and adjust the first delay length parameter of the called interface to the second delay length parameter based on a comparison result that the usage is greater than or equal to the preset usage threshold, or adjust the first delay length parameter of the called interface to a third delay length parameter based on a comparison result that the usage is less than the preset usage threshold, where delay duration corresponding to the third delay length parameter is less than the delay duration corresponding to the second delay length parameter.

In this embodiment of the present disclosure, further, the comparison unit 35 is further configured to, at a predetermined moment before the preset duration ends, compare at least one recorded operation that is recorded before the predetermined moment with the operation of the malicious behavior.

The malware detection apparatus 3000 further includes a sending unit configured to send a software end-of-running message to the sandbox based on a comparison result that no operation that matches the operation of the malicious behavior exists in the at least one recorded operation that is recorded before the predetermined moment.

The recording unit 31 is further configured to record at least one operation executed by the to-be-detected software in a time period from the predetermined moment to a moment at which the preset duration ends.

The comparison unit 35 is further configured to compare the operation of the malicious behavior with the at least one recorded operation executed by the to-be-detected software in the time period from the predetermined moment to the moment at which the preset duration ends, and determine, based on a comparison result that an operation that matches the operation of the malicious behavior exists in the at least one recorded operation executed by the to-be-detected software in the time period from the predetermined moment to the moment at which the preset duration ends, that the to-be-detected software is malware.

The malware detection apparatus provided in this apparatus embodiment may be a device on which the sandbox in the method embodiment is located, or be a function module in the device. The apparatus may be integrated into a network device such as a firewall or a gateway device, or may be integrated into a file server or a web page server. For another additional function that may be implemented by the malware detection apparatus, refer to the description in the method embodiment. Details are not described herein again.

The malware detection apparatus provided in this embodiment of the present disclosure runs to-be-detected software in a sandbox, and records at least one operation executed within preset duration after the to-be-detected software starts to run, in a process of recording the at least one operation, detects whether at least one interface that has a delay attribute in the sandbox is called, when it is detected that any one of the interface is called, determines whether delay duration corresponding to a first delay length parameter of the called interface is greater than preset duration, if the delay duration corresponding to the first delay length parameter is greater than the preset duration, adjusts the first delay length parameter of the called interface to a second delay length parameter, where delay duration corresponding to the second delay length parameter is less than the preset duration, and compares the at least one recorded operation with an operation of a malicious behavior, and determines, based on a comparison result that an operation that matches the operation of the malicious behavior exists in the at least one recorded operation, that the to-be-detected software is malware. When the interface that has a delay attribute is called, the apparatus reduces delay duration of delay execution to enable the malicious behavior to be executed in the process of recording the at least one operation executed within the preset duration after the to-be-detected software starts to run, and accordingly, the malicious behavior may be exposed in advance, which can implement effective monitoring, and therefore can improve efficiency and accuracy of malware detection.

Figure 4:
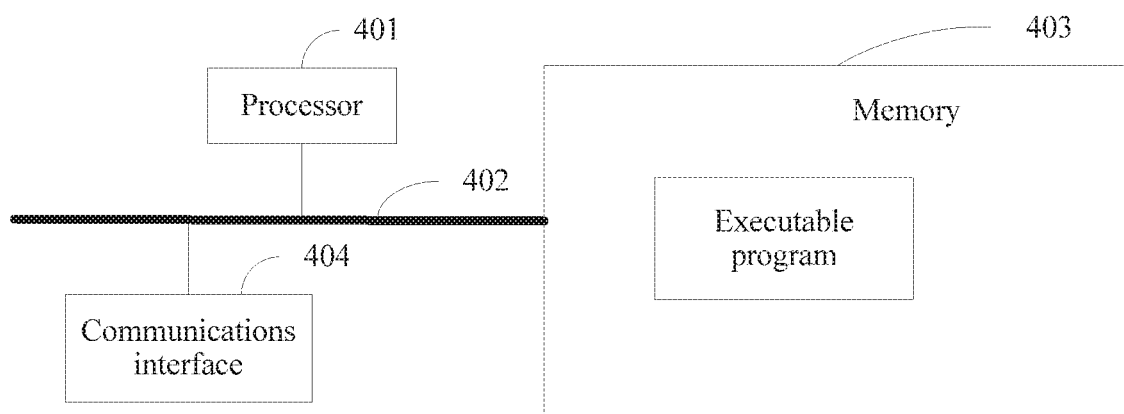
FIG. 4 is a second schematic structural diagram of a malware detection apparatus according to an embodiment of the present disclosure.

As shown in FIG. 4, FIG. 4 is another structural diagram of the malware detection apparatus 3000 according to an embodiment of the present disclosure. The malware detection apparatus 3000 includes at least one processor 401, a communications bus 402, a memory 403, and at least one communications interface 404.

The communications bus 402 is configured to implement connection and communication between the foregoing components, and the communications interface 404 is configured to be connected to and communicate with an external device.

The memory 403 is configured to store executable program code. By executing the program code, the processor 401 is configured to run to-be-detected software in a sandbox, and record at least one operation executed within preset duration after the to-be-detected software starts to run, in a process of recording the at least one operation, detect whether at least one interface that has a delay attribute in the sandbox is called, when it is detected that any one of the interface is called, determine whether delay duration corresponding to a first delay length parameter of the called interface is greater than the preset duration, adjust the first delay length parameter of the called interface to a second delay length parameter if the delay duration corresponding to the first delay length parameter is greater than the preset duration, where delay duration corresponding to the second delay length parameter is less than the preset duration, and compare the at least one recorded operation with an operation of a malicious behavior, and determine, based on a comparison result that an operation that matches the operation of the malicious behavior exists in the at least one recorded operation, that the to-be-detected software is malware.

The processor 401 is further configured to adjust the first delay length parameter of the called interface to a product of the first delay length parameter and a preset adjustment parameter, where the adjustment parameter is greater than 0 and less than 1.

The preset adjustment parameter includes a first adjustment parameter and a second adjustment parameter, and the first adjustment parameter is greater than the second adjustment parameter.

The processor 401 is further configured to obtain usage of a central processing unit of a device on which the sandbox is located, compare the obtained usage with a preset usage threshold, and adjust the first delay length parameter of the called interface to a product of the first delay length parameter and the first adjustment parameter based on a comparison result that the usage is greater than or equal to the preset usage threshold, or adjust the first delay length parameter of the called interface to a product of the first delay length parameter and the second adjustment parameter based on a comparison result that the usage is less than the preset usage threshold.

The processor 401 is further configured to obtain usage of a central processing unit of a device on which the sandbox is located, compare the obtained usage with a preset usage threshold, and adjust the first delay length parameter of the called interface to the second delay length parameter based on a comparison result that the usage is greater than or equal to the preset usage threshold, or adjust the first delay length parameter of the called interface to a third delay length parameter based on a comparison result that the usage is less than the preset usage threshold, where delay duration corresponding to the third delay length parameter is less than the delay duration corresponding to the second delay length parameter.

The processor 401 is further configured to compare the at least one recorded operation with the operation of the malicious behavior at a predetermined moment before the preset duration ends, send a software end-of-running message to the sandbox based on a comparison result that no operation that matches the operation of the malicious behavior exists in the at least one recorded operation, record at least one operation executed by the to-be-detected software in a time period from the predetermined moment to a moment at which the preset duration ends, and compare the operation of the malicious behavior with the at least one recorded operation executed by the to-be-detected software in the time period from the predetermined moment to the moment at which the preset duration ends, and determine, based on a comparison result that an operation that matches the operation of the malicious behavior exists in the at least one recorded operation executed by the to-be-detected software in the time period from the predetermined moment to the moment at which the preset duration ends, that the to-be-detected software is malware.

In this embodiment of the present disclosure, the interface includes one or a combination of an interface for delaying one process, an interface for delaying multiple processes, an interface for delaying a timer, or an interface for obtaining a system time.

The malware detection apparatus provided in this apparatus embodiment may be a device on which a sandbox in the method embodiment is located. The apparatus may be a network device such as a firewall or a gateway device, or may be a file server or a web page server. For another additional function that may be implemented by the malware detection apparatus, refer to the description in the method embodiment. Details are not described herein again.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A malware detection method implemented by a computing device, wherein the malware detection method comprises:

running to-be-detected software in a sandbox located on the computing device;

recording one or more operations executed by the to-be-detected software in the sandbox after the to-be-detected software starts to run;

detecting whether at least one interface having a delay attribute in the sandbox is called while recording the one or more operations;

determining whether a first delay duration corresponding to a first delay length parameter of a called interface causes a first operation to be executed by the to-be-detected software after a preset duration, wherein the preset duration begins when the to-be-detected software starts to run;

adjusting the first delay length parameter to a second delay length parameter and adjusting a system time returned to the to-be-detected software when the first delay duration causes the first operation to be executed by the to-be-detected software after the preset duration, wherein a second delay duration corresponding to the second delay length parameter causes the first operation to be executed by the to-be-detected software within the preset duration, wherein the second delay length parameter comprises a product of the first delay length parameter and a preset adjustment parameter, and wherein the system time returned to the to-be-detected software comprises a current system time divided by the preset adjustment parameter;

comparing a recorded operation with an operation of a malicious behavior, wherein the recorded operation comprises one or more operations that the to-be-detected software executed within the preset duration; and determining, based on a comparison result that an operation matching the operation of the malicious behavior exists in the recorded operation, that the to-be-detected software is malware.

2. The malware detection method of claim 1, wherein the preset adjustment parameter is greater than zero and less than one.

3. The malware detection method of claim 2, wherein the preset adjustment parameter comprises a first adjustment parameter and a second adjustment parameter, wherein the first adjustment parameter is greater than the second adjustment parameter, and wherein the malware detection method further comprises:
obtaining first usage of a central processing unit of the computing device;
comparing the first usage with a preset usage threshold;
adjusting the first delay length parameter to a first product of the first delay length parameter and the first adjustment parameter based on a comparison result that the first usage is greater than or equal to the preset usage threshold; and
adjusting the first delay length parameter to a second product of the first delay length parameter and the second adjustment parameter based on a comparison result that the first usage is less than the preset usage threshold.

4. The malware detection method of claim 3, further comprising:
comparing, at a predetermined moment before the preset duration ends, at least one fourth recorded operation that is recorded before the predetermined moment with the operation of the malicious behavior;
sending a software end-of-running message to the sandbox based on a comparison result that an operation matching the operation of the malicious behavior does not exist in the at least one fourth recorded operation;
recording at least one operation executed by the to-be-detected software in a third time period from the predetermined moment to a moment at which the preset duration ends;
comparing the operation of the malicious behavior with the at least one operation executed by the to-be-detected software in the third time period; and
determining, based on a comparison result that an operation matching the operation of the malicious behavior exists in the at least one operation executed by the to-be-detected software in the third time period, that the to-be-detected software is malware.

5. The malware detection method of claim 2, further comprising:
comparing, at a predetermined moment before the preset duration ends, at least one third recorded operation that is recorded before the predetermined moment with the operation of the malicious behavior;
sending a software end-of-running message to the sandbox based on a comparison result that an operation matching the operation of the malicious behavior does not exist in the at least one third recorded operation;
recording at least one operation executed by the to-be-detected software in a second time period from the predetermined moment to a moment at which the preset duration ends;
comparing the operation of the malicious behavior with the at least one operation executed by the to-be-detected software in the second time period; and
determining, based on a comparison result that an operation matching the operation of the malicious behavior exists in the at least one operation executed by the to-be-detected software in the second time period, that the to-be-detected software is malware.

6. The malware detection method of claim 1, further comprising:
obtaining second usage of a central processing unit of the computing device;
comparing the second usage with a preset usage threshold;
adjusting the first delay length parameter to the second delay length parameter based on a comparison result that the second usage is greater than or equal to the preset usage threshold; and
adjusting the first delay length parameter to a third delay length parameter based on a comparison result that the second usage is less than the preset usage threshold, wherein a third delay duration corresponding to the third delay length parameter is less than the second delay duration.

7. The malware detection method of claim 6, further comprising:
comparing, at a predetermined moment before the preset duration ends, at least one fifth recorded operation that is recorded before the predetermined moment with the operation of the malicious behavior;
sending a software end-of-running message to the sandbox based on a comparison result that an operation matching the operation of the malicious behavior does not exist in the at least one fifth recorded operation;
recording at least one operation executed by the to-be-detected software in a fourth time period from the predetermined moment to a moment at which the preset duration ends;
comparing the operation of the malicious behavior with the at least one operation executed by the to-be-detected software in the fourth time period; and
determining, based on a comparison result that an operation matching the operation of the malicious behavior exists in the at least one operation executed by the to-be-detected software in the fourth time period, that the to-be-detected software is malware.

8. The malware detection method of claim 1, further comprising:
comparing, at a predetermined moment before the preset duration ends, at least one second recorded operation that is recorded before the predetermined moment with the operation of the malicious behavior;
sending a software end-of-running message to the sandbox based on a comparison result that an operation matching the operation of the malicious behavior does not exist in the at least one second recorded operation;
recording at least one operation executed by the to-be-detected software in a first time period from the predetermined moment to a moment at which the preset duration ends;
comparing the operation of the malicious behavior with the at least one operation executed by the to-be-detected software in the first time period; and
determining, based on a comparison result that an operation matching the operation of the malicious behavior exists in the at least one operation executed by the to-be-detected software in the first time period, that the to-be-detected software is malware.

9. The malware detection method of claim 1, wherein the at least one interface comprises one or a combination of an interface for delaying one process, an interface for delaying a plurality of processes, an interface for delaying a timer, or an interface for obtaining the system time.

10. A malware detection apparatus, comprising:
a memory comprising instructions; and a processor coupled to the memory, wherein the instructions cause the processor to be configured to:
  run to-be-detected software in a sandbox located on the malware detection apparatus;
  record one or more operations executed by the to-be-detected software in the sandbox after the to-be-detected software starts to run;
  detect whether at least one interface having a delay attribute in the sandbox is called during duration of recording of the one or more operations;
  determine whether a first delay duration corresponding to a first delay length parameter of a called interface causes a first operation to be executed by the to-be-detected software after a preset duration, wherein the preset duration begins when the to-be-detected software starts to run;
  adjust the first delay length parameter to a second delay length parameter and adjust a system time returned to the to-be-detected software when the first delay duration causes a first operation to be executed by the to-be-detected software after the preset duration, wherein a second delay duration corresponding to the second delay length parameter causes the first operation to be executed by the to-be-detected software within the preset duration, wherein the second delay length parameter comprises a product of the first delay length parameter and a preset adjustment parameter, and wherein the system time returned to the to-be-detected software comprises a current system time divided by the preset adjustment parameter;
  compare a recorded operation with an operation of a malicious behavior, wherein the recorded operation comprises one or more operations that the to-be-detected software executed within the preset duration; and
  determine, based on a comparison result that an operation matching the operation of the malicious behavior exists in the recorded operation, that the to-be-detected software is malware.

11. The malware detection apparatus of claim 10, wherein the preset adjustment parameter is greater than zero and less than one.

12. The malware detection apparatus of claim 11, wherein the preset adjustment parameter comprises a first adjustment parameter and a second adjustment parameter, wherein the first adjustment parameter is greater than the second adjustment parameter, and wherein the instructions further cause the processor to be configured to:
  obtain first usage of a central processing unit of the malware detection apparatus;
  compare the first usage with a preset usage threshold;
  adjust the first delay length parameter to a first product of the first delay length parameter and the first adjustment parameter based on a comparison result that the first usage is greater than or equal to the preset usage threshold; and
  adjust the first delay length parameter to a second product of the first delay length parameter and the second adjustment parameter when the first usage is less than the preset usage threshold.

13. The malware detection apparatus of claim 12, wherein the instructions further cause the processor to be configured to:
  compare, at a predetermined moment before the preset duration ends, at least one fourth recorded operation that is recorded before the predetermined moment with the operation of the malicious behavior;
  send a software end-of-running message to the sandbox based on a comparison result that an operation matching the operation of the malicious behavior does not exist in the at least one fourth recorded operation;
  record at least one operation executed by the to-be-detected software in a third time period from the predetermined moment to a moment at which the preset duration ends;
  compare the operation of the malicious behavior with the at least one operation executed by the to-be-detected software in the third time period; and
  determine, based on a comparison result that an operation matching the operation of the malicious behavior exists in the at least one operation executed by the to-be-detected software in the third time period, that the to-be-detected software is malware.

14. The malware detection apparatus of claim 11, wherein the instructions further cause the processor to be configured to:
  compare, at a predetermined moment before the preset duration ends, at least one third recorded operation that is recorded before the predetermined moment with the operation of the malicious behavior;
  send a software end-of-running message to the sandbox based on a comparison result that an operation matching the operation of the malicious behavior does not exist in the at least one third recorded operation;
  record at least one operation executed by the to-be-detected software in a second time period from the predetermined moment to a moment at which the preset duration ends;
  compare the operation of the malicious behavior with the at least one operation executed by the to-be-detected software in the second time period; and
  determine, based on a comparison result that an operation matching the operation of the malicious behavior exists in the at least one operation executed by the to-be-detected software in the second time period, that the to-be-detected software is malware.

15. The malware detection apparatus of claim 10, wherein the instructions further cause the processor to be configured to:
  obtain second usage of a central processing unit of the malware detection apparatus;
  compare the second usage with a preset usage threshold;
  adjust the first delay length parameter to the second delay length parameter based on a comparison result that the second usage is greater than or equal to the preset usage threshold; and
  adjust the first delay length parameter to a third delay length parameter based on a comparison result that the usage is less than the preset usage threshold, wherein a third delay duration corresponding to the third delay length parameter is less than the second delay duration.

16. The malware detection apparatus of claim 15, wherein the instructions further cause the processor to be configured to:
  compare, at a predetermined moment before the preset duration ends, at least one fifth recorded operation that is recorded before the predetermined moment with the operation of the malicious behavior;
  send a software end-of-running message to the sandbox based on a comparison result that an operation matching the operation of the malicious behavior does not exist in the at least one fifth recorded operation;

record at least one operation executed by the to-be-detected software in a fourth time period from the predetermined moment to a moment at which the preset duration ends;

compare the operation of the malicious behavior with the at least one operation executed by the to-be-detected software in the fourth time period; and determine, based on a comparison result that an operation matching the operation of the malicious behavior exists in the at least one operation executed by the to-be-detected software in the fourth time period, that the to-be-detected software is malware.

17. The malware detection apparatus of claim 15, wherein the at least one interface comprises one or a combination of an interface for delaying one process, an interface for delaying a timer, or an interface for obtaining the system time.

18. The malware detection apparatus of claim 10, wherein the instructions further cause the processor to be configured to:

compare, at a predetermined moment before the preset duration ends, at least one second recorded operation that is recorded before the predetermined moment with the operation of the malicious behavior;

send a software end-of-running message to the sandbox based on a comparison result that an operation matching the operation of the malicious behavior does not exist in the at least one second recorded operation;

record at least one operation executed by the to-be-detected software in a first time period from the predetermined moment to a moment at which the preset duration ends;

compare the operation of the malicious behavior with the at least one operation executed by the to-be-detected software in the first time period; and determine, based on a comparison result that an operation matching the operation of the malicious behavior exists in the at least one operation executed by the to-be-detected software in the first time period, that the to-be-detected software is malware.

19. The malware detection apparatus of claim 10, wherein the at least one interface comprises an interface for delaying a plurality of processes.

20. A malware detection method implemented by a computing device, the malware detection method comprising:

running to-be-detected software in a sandbox that is located on the computing device;

recording one or more operations executed by the to-be-detected software in the sandbox after the to-be-detected software starts to run;

comparing, at a predetermined moment before a preset duration ends, at least one first recorded operation that is recorded before the predetermined moment with an operation of a malicious behavior, wherein the preset duration begins when the to-be-detected software starts to run;

sending a software end-of-running message to the sandbox based on a comparison result that an operation matching the operation of the malicious behavior does not exist in the at least one first recorded operation;

recording at least one operation executed by the to-be-detected software in a first time period from the predetermined moment to a moment at which the preset duration ends;

comparing the operation of the malicious behavior with the at least one operation executed by the to-be-detected software in the first time period; and determining, based on a comparison result that an operation matching the operation of the malicious behavior exists in the at least one operation executed by the to-be-detected software in the first time period, that the to-be-detected software is malware.

* * * * *